US011422445B2

(12) United States Patent
Chang et al.

(10) Patent No.: US 11,422,445 B2
(45) Date of Patent: Aug. 23, 2022

(54) PROJECTOR WITH TEMPERATURE SENSOR AND PROJECTOR PROTECTION METHOD

(71) Applicant: DELTA ELECTRONICS, INC., Taoyuan (TW)

(72) Inventors: Meng-Sheng Chang, Taoyuan (TW); Hui-Hsiung Wang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 44 days.

(21) Appl. No.: 16/504,320

(22) Filed: Jul. 7, 2019

(65) Prior Publication Data

US 2020/0124951 A1 Apr. 23, 2020

(30) Foreign Application Priority Data

Oct. 23, 2018 (CN) .......................... 201811234216.9

(51) Int. Cl.
*G03B 21/16* (2006.01)
*G03B 21/20* (2006.01)
*G05D 23/19* (2006.01)

(52) U.S. Cl.
CPC ......... *G03B 21/16* (2013.01); *G03B 21/2053* (2013.01); *G03B 21/204* (2013.01); *G05D 23/19* (2013.01)

(58) Field of Classification Search
CPC .. G03B 21/16; G03B 21/2053; G03B 21/204; G05D 23/19
See application file for complete search history.

(56) References Cited

U.S. PATENT DOCUMENTS

| 6,886,942 B2 | 5/2005 | Okada et al. | |
| 7,866,826 B2* | 1/2011 | Kobayashi | G03B 21/16 353/52 |
| 9,091,909 B2* | 7/2015 | Toyota | H04N 9/3144 |
| 2004/0263797 A1* | 12/2004 | Russell | G03B 21/16 353/57 |
| 2005/0273208 A1* | 12/2005 | Yazawa | G01K 7/425 700/299 |

(Continued)

FOREIGN PATENT DOCUMENTS

| CN | 101169575 A | 4/2008 |
| CN | 101876322 A | 11/2010 |

(Continued)

*Primary Examiner* — Magda Cruz
(74) *Attorney, Agent, or Firm* — CKC & Partners Co., LLC

(57) ABSTRACT

A projector protection method includes: multiple temperature sensors detect temperatures of multiple areas in a projector to obtain multiple temperature parameters respectively; a processor lowers an output power of a laser source when any temperature parameter corresponding to one of areas falls into corresponding one of multiple first temperature intervals and multiple fans in the projector are set to a maximum speed; and the processor turns off the laser source when any temperature parameter corresponding to one of areas falls into corresponding one of multiple second temperature intervals. The second temperature interval and the first temperature interval corresponding to the same temperature parameter are different from each other.

13 Claims, 3 Drawing Sheets

(56) References Cited

U.S. PATENT DOCUMENTS

| | | | | |
|---|---|---|---|---|
| 2007/0152552 | A1* | 7/2007 | Shih | G05D 23/1931 |
| | | | | 313/13 |
| 2011/0025987 | A1* | 2/2011 | Furumi | G03B 21/16 |
| | | | | 353/57 |
| 2011/0242496 | A1* | 10/2011 | Kimoto | G03B 21/16 |
| | | | | 353/31 |
| 2012/0061071 | A1* | 3/2012 | Wang | G03B 21/16 |
| | | | | 165/288 |
| 2012/0075599 | A1* | 3/2012 | Park | G03B 21/16 |
| | | | | 353/121 |
| 2013/0314674 | A1* | 11/2013 | Toyota | G03B 21/2053 |
| | | | | 353/58 |
| 2017/0054957 | A1* | 2/2017 | Ikeura | G03B 21/16 |
| 2017/0104970 | A1* | 4/2017 | Li | H04N 9/3161 |
| 2018/0143517 | A1* | 5/2018 | Xing | G03B 21/16 |
| 2018/0231764 | A1* | 8/2018 | Ohara | H04N 5/63 |
| 2020/0371415 | A1* | 11/2020 | Arai | G03B 21/16 |

FOREIGN PATENT DOCUMENTS

| | | | | |
|---|---|---|---|---|
| CN | 203189301 | U | 9/2013 | |
| CN | 106483742 | A | 3/2017 | |
| CN | 107045253 | A | 8/2017 | |
| CN | 108073020 | A * | 5/2018 | G03B 21/20 |
| TW | 200923554 | A | 6/2009 | |
| TW | 201211673 | A1 | 3/2012 | |
| TW | I362559 | B1 | 4/2012 | |
| TW | 201229428 | A1 | 7/2012 | |
| WO | WO-2018010239 | A1 * | 1/2018 | F04D 27/00 |
| WO | WO-2019113855 | A1 * | 6/2019 | G05D 23/20 |

* cited by examiner

PROJECTOR WITH TEMPERATURE SENSOR AND PROJECTOR PROTECTION METHOD

RELATED APPLICATIONS

This application claims priority to China Application Serial Number 201811234216.9, filed Oct. 23, 2018, which is herein incorporated by reference.

BACKGROUND

Technical Field

The disclosure relates to a projector and a projector protection method, particularly to a projector with a laser source and a protection method thereof.

Description of Related Art

Generally speaking, in order to avoid damaging the projector due to overheating, the projector comes with an overtemperature protection mechanism. Conventionally, to avoid overheating and causing serious damage to the projector, there exists one way which immediately turns off the light source of the projector when the predetermined overheating point occurs.

However, before turning off the light source of a projector, there is usually no warning, or far short of warning time. Such suddenly coming to a stop of playing would cause unexpected loss and inconvenience. Therefore, how to extend the playing time under a bit overheating condition that does not damage the projector is one of the important issues in this field.

SUMMARY

One aspect of the present disclosure is a projector protection method including detecting, by multiple temperature sensors, temperatures of multiple areas in a projector to obtain multiple temperature parameters respectively; lowering, by a processor, an output power of a laser source when the temperature parameter corresponding to any one of the areas falls into corresponding one of multiple first temperature intervals and multiple fans in the projector are set to a maximum speed; and turning off, by the processor, the laser source when the temperature parameter corresponding to any one of the areas falls into corresponding one of multiple second temperature intervals. The second temperature interval and the first temperature interval corresponding to the same temperature parameter are different from each other.

Another aspect of the present disclosure is a projector including a laser source, multiple temperature sensors, multiple fans and a processor. The laser source is configured to output laser beam. The temperature sensors are arranged in multiple areas in the projector respectively and configured to detect temperature of the corresponding areas to obtain multiple temperature parameters respectively. The fans are configured to lower temperature of the areas in the projector. The processor is configured to: lower the output power of the laser source when the temperature parameter corresponding to any one of the areas falls into corresponding one of multiple first temperature intervals and the fans are all set to a maximum speed; and turn off the laser source when the temperature parameter corresponding to any one of the areas falls into corresponding one of multiple second temperature intervals. The first and the second temperature intervals corresponding to the same temperature parameter are different.

DETAILED DESCRIPTION

The following embodiments are disclosed with accompanying diagrams for detailed description. For illustration clarity, many details of practice are explained in the following descriptions. However, it should be understood that these details of practice do not intend to limit the present disclosure. That is, these details of practice are not necessary in parts of embodiments of the present disclosure. Furthermore, for simplifying the diagrams, some of the conventional structures and elements are shown with schematic illustrations.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

In the following description and in the claims, the terms "include" and "comprise" are used in an open-ended fashion, and thus should be interpreted to mean "include, but not limited to." As used herein, the term "and/or" includes any and all combinations of one or more of the associated listed items.

In this document, the term "coupled" may also be termed "electrically coupled," and the term "connected" may be termed "electrically connected." "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

Figure 1:
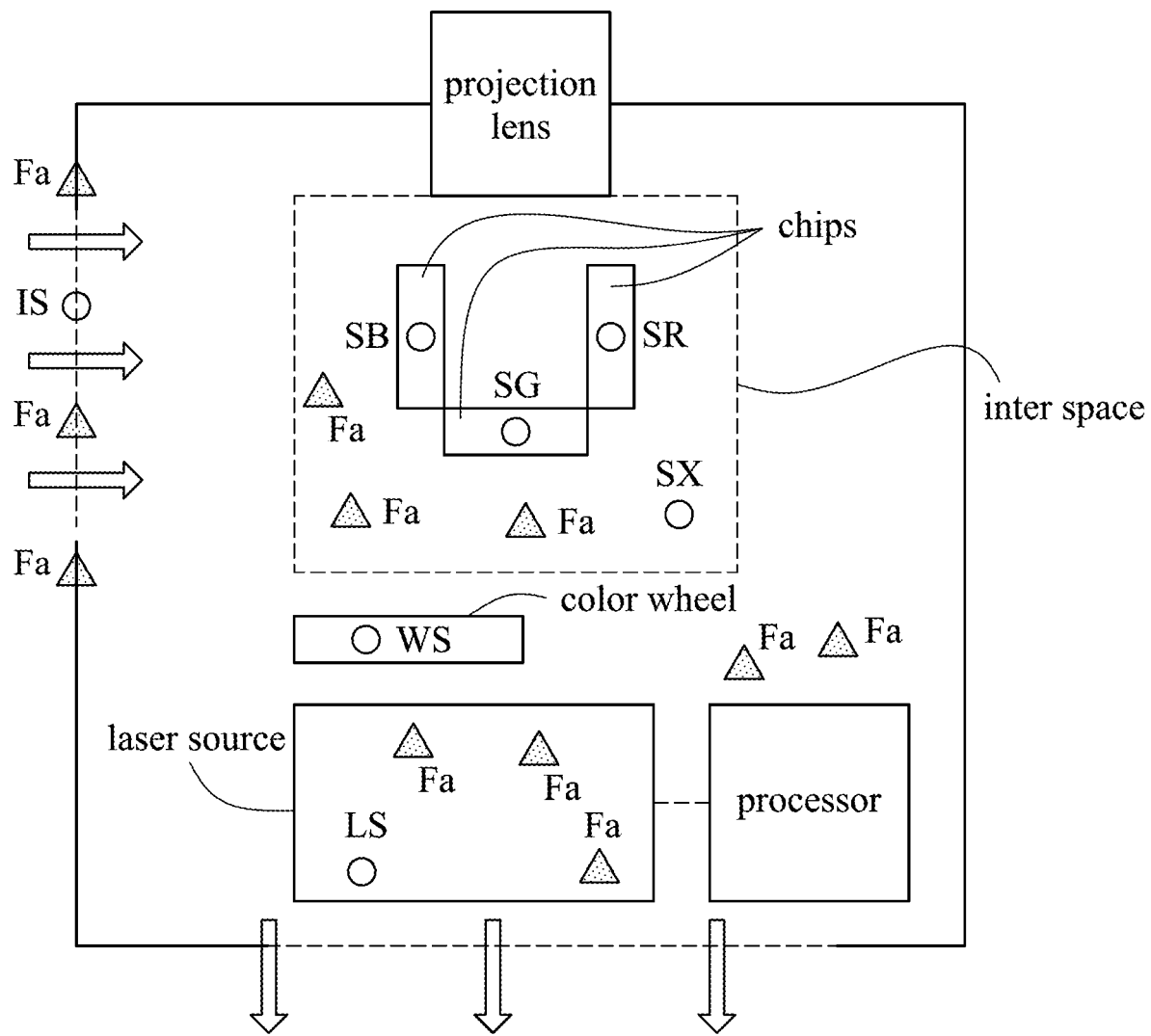
FIG. 1 is a schematic diagram illustrating a projector in accordance with some embodiments of the disclosure.

Please refer to FIG. 1. FIG. 1 is a schematic diagram illustrating a projector 100 in accordance with some embodiments of the disclosure. As shown in FIG. 1, in some embodiments, the projector 100 includes a laser source, a color wheel, a projection lens, multiple fans Fa, multiple temperature sensors IS, SR, SG, SB, SX, WS, LS, a chip and a processor. In some embodiments, the projector 100 further includes one or more speed sensors.

In operation, the laser source is configured to output a laser beam. The color wheel is configured to receive the laser beam and excite one or more color beams. The projection lens is configured to receive the laser beam or other color beams to project. The fans Fa are configured to lower temperature. The temperature sensors IS, SR, SG, SB, SX, WS, LS are configured to detect temperature and obtain temperature parameters. The speed sensor is configured to detect speed of the fans Fa to obtain speed parameters. The processor is configured to receive the temperature parameters and/or the speed parameters, and control the laser source and/or the fans according to the temperature parameters and/or the speed parameters.

Specifically, in some embodiments, the processor may be realized by various processing circuits, a digital signal processor (DSP), a complex programmable logic device (CPLD), a field-programmable gate array (FPGA), etc.

Configurationally, the processor is coupled to the laser source and fans Fa. In addition, the projector 100 is divided into multiple areas. Multiple fans Fa and multiple temperature sensors IS, SR, SG, SB, SX, WS, LS are arranged according to different areas or different elements. For example, as shown in FIG. 1, a color wheel temperature sensor WS is arranged with the color wheel. A laser source temperature sensor LS is arranged with the laser source. For another example, chip temperature sensors SR, SG and SB are arranged with a red, a green and a blue chip respectively. An inner space temperature sensor SX is arranged in the inner space of the projector 100. An inlet temperature sensor IS is arranged at the inlet.

It should be noted that though seven temperature sensors IS, SR, SG, SB, SX, WS, LS and eleven fans Fa are illustrated in FIG. 1, the number and the positions of the temperature sensors and fans are merely example, but not intended to limit the disclosure. Those of ordinary skilled in the art may adjust the number and the positions of temperature sensors or fans in the projector 100 based on actual needs.

Figure 2:
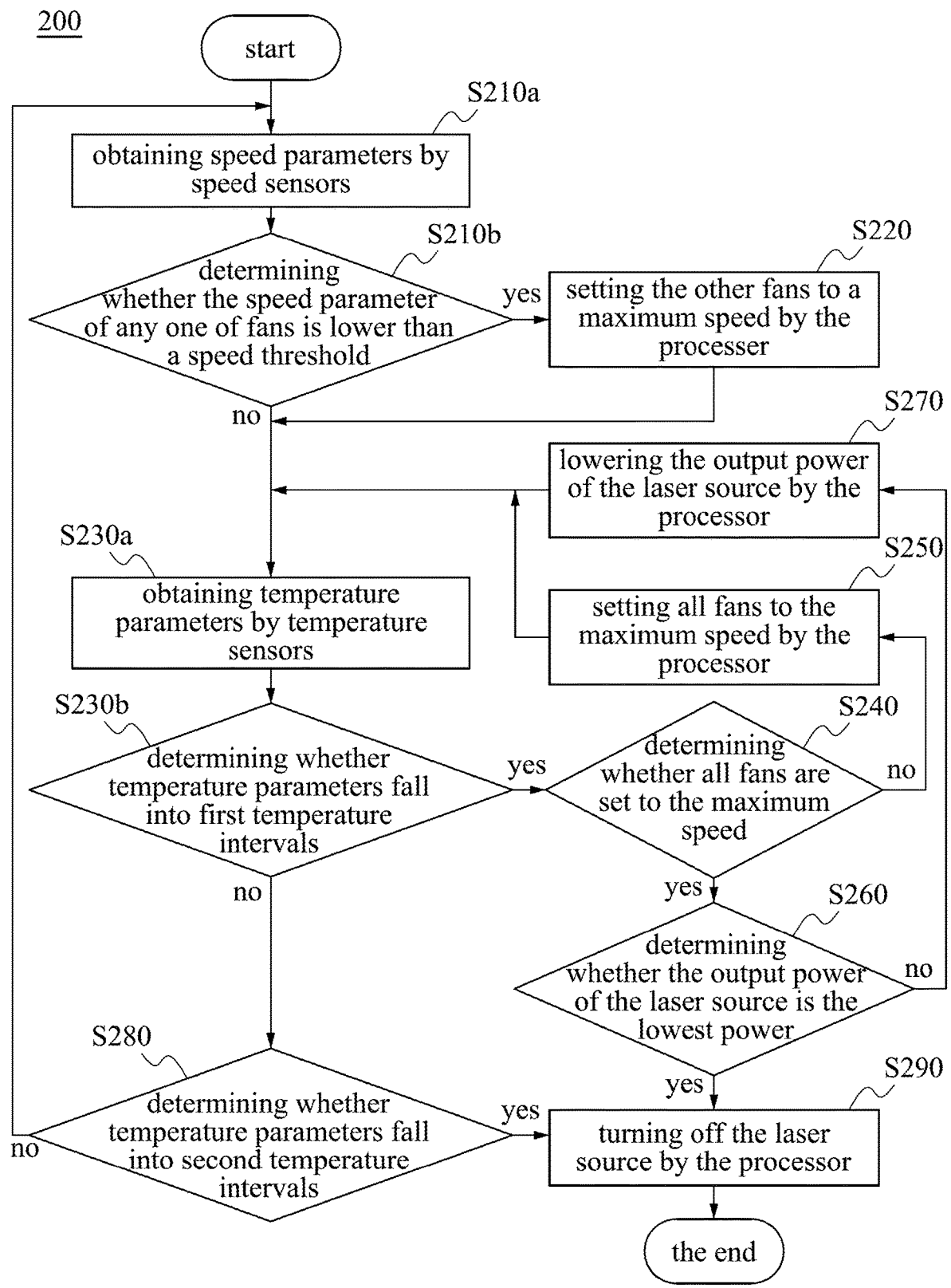
FIG. 2 is a flowchart illustrated a projector protection method in accordance with some embodiments of the disclosure.

Please refer to FIG. 2. FIG. 2 is a flowchart illustrated a projector protection method 200 in accordance with some embodiments of the disclosure. For convenience and clarity of explanation, the projector protection method 200 described below will be matched with the embodiment of FIG. 1, but not intended to limit itself. Various alterations and modifications may be performed on the disclosure by those of ordinary skills in the art without departing from the principle and spirit of the disclosure. As shown in FIG. 2, the projector protection method 200 includes operations S210a, S210b, S220, S230a, S230b, S240, S250, S260, S270, S280 and S290.

Firstly, in operation S210a, detecting, by multiple speed sensors, speed of the fans in the projector 100 to obtain multiple speed parameters respectively. Next, in operation S210b, determining, by the processor, whether the speed parameter of any one of the fans Fa is lower than a speed threshold. Specifically, speed of the corresponding fans Fa in the projector 100 is detected by each of the speed sensors respectively, so as to obtain the corresponding speed parameters, and the speed parameters are sent to the processor.

Figure 3:
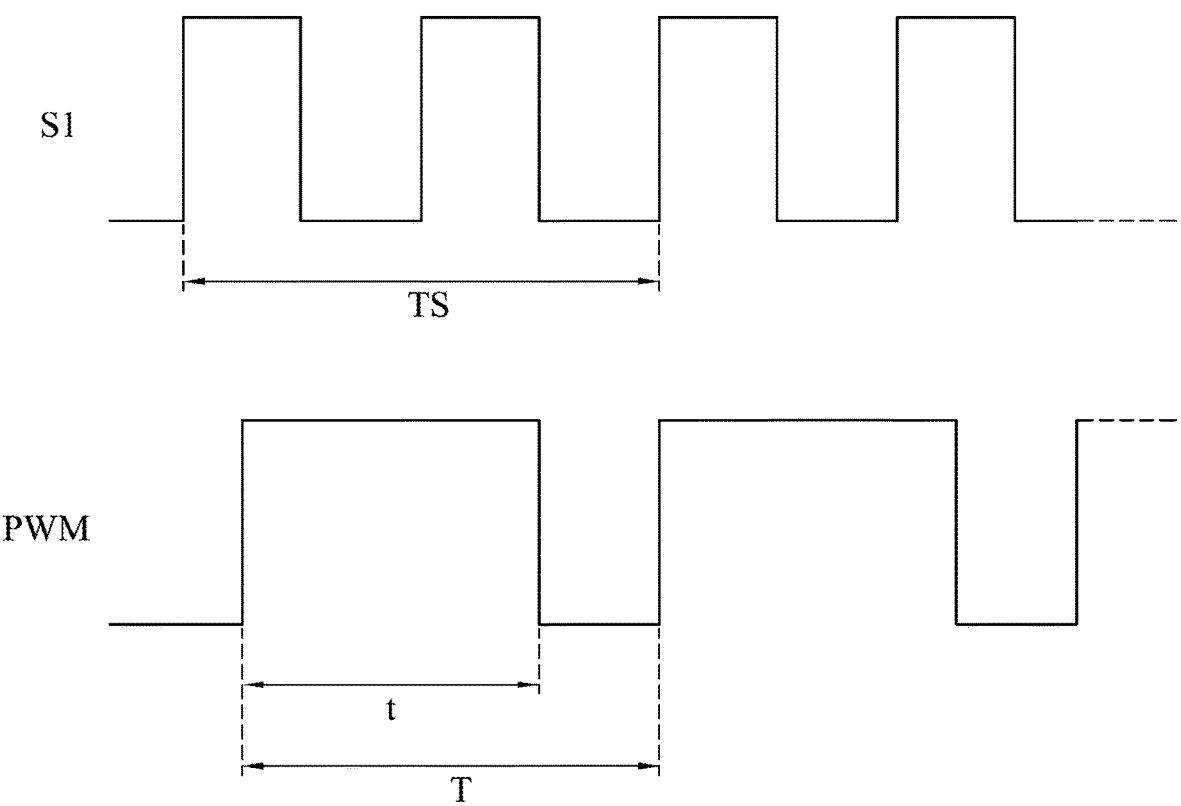
FIG. 3 is a diagram illustrated signals of a fan in accordance with some embodiments of the disclosure.

For example, in some embodiments, the fans Fa may be pulse width modulation (PWM) fans. As shown in FIG. 3, the speed parameter of the fan Fa is calculated by the processor of the projector 100 according to a feedback signal 51 provided by the fan Fa. The feedback signal 51 may be generated by a hall sensor in the fan Fa. When the feedback signal 51 reaches to peak twice, it represents that the fan Fa rotates one circle. In other words, TS shown in FIG. 3 is the time period (in second unit) of the fan rotates one circle. Therefore, speed of the fan calculated by the processor of the projector 100 is 60/TS (RPM).

In other words, the speed parameters sent from each speed sensors are received by the processor, and each of the speed parameters is determined whether the speed parameter is lower than the speed threshold. For example, if the circuit of the fan Fa is short or there are other faults in fan Fa resulting in the fan Fa not working, the speed parameter detected by the corresponding speed sensor will be zero, and then the processor will determine that the fan Fa is malfunction. For another example, when the fan Fa is stuck due to dust accumulation or foreign matters, the speed of the fan Fa is slowed down, and the speed parameter detected by the corresponding speed sensor will be lower than the speed threshold, and then the processor will determine that the fan Fa is abnormal.

When the speed parameter of any one of the fans Fa is lower than the speed threshold, operation S220 is executed, setting the other fans Fa to the maximum speed. Specifically, a control signal PWM is sent from the processor of the projector 100 to adjust the speed of the fan Fa. The processor of the projector 100 may control the speed of the fan Fa by sending control signals PWM with different duty cycles. As shown in FIG. 3, the duty cycle t/T may be about 60%. When the speed is insufficient, the processor may increase the duty cycle t/T of the control signal PWM to about 100% so that the fan Fa runs at full speed.

In other words, when a part of the fans Fa in the projector 100 may start to have an abnormality or a slight malfunction, increasing the speed of all available fans Fa first is taken as preventive measures. In this way, by increasing the speed of the other available fans Fa in place of the faulty fan Fa, the projector 100 is prevented from heating up due to the partial fan's Fa failure.

When the speed parameters of all the fans Fa are not lower than the speed threshold, the operations S230a and S230b are executed. In operation S230a, detecting, by multiple temperature sensors IS, SR, SG, SB, SX, WS, LS, temperatures of multiple areas in the projector 100 to obtain multiple temperature parameters.

Specifically, each of the temperature sensors IS, SR, SG, SB, SX, WS, LS detects temperature of the corresponding areas or the corresponding elements in the projector 100 to obtain the corresponding temperature parameters respectively, and the temperature parameters are sent to the processor. For example, the inlet temperature sensor IS detects temperature of the inlet. The laser source temperature sensor LS detects temperature of the laser source. The color wheel temperature sensor WS detects temperature of the color wheel. The chip temperature sensors SR, SG and SB detect temperature of the red, green and blue chips respectively. The inner space temperature sensor SX detects temperature of the inner space of the projector 100.

Next, in operation S230b, determining, by the processor, whether the temperature parameter corresponding to any one of the areas falls into the corresponding one of multiple first temperature intervals.

Specifically, the processor receives temperature parameters sent from each temperature sensors IS, SR, SG, SB, SX, WS, LS, and determines whether any one of the temperature parameters falls into the corresponding one of the first temperature intervals. The first temperature interval represents temperature which is slightly higher than the temperature of normal situation. In other words, the processor determines whether temperature of each element or each area starts to appear abnormal.

In some embodiments, the temperature parameters of normal situation corresponding to different positions of the projector 100 are not totally the same, therefore, the first temperature intervals corresponding to temperature parameters of different positions are not totally the same. For example, the first temperature interval corresponding to the temperature parameter of the inlet is 35~43 degrees Celsius. The first temperature interval corresponding to the temperature parameter of the red laser source is 52~58 degrees Celsius. The first temperature interval corresponding to the temperature parameter of the other laser sources is 67~73 degrees Celsius. The first temperature interval corresponding to the temperature parameter of the color wheel is 82~88 degrees Celsius. The first temperature interval corresponding to the temperature parameter of the chip is 38~43 degrees Celsius. The first temperature interval corresponding to the temperature parameter of the inner space of the projector 100 is 45~50 degrees Celsius. It should be noted that values described above are merely examples, but not limited to the present disclosure.

In other words, in some embodiments, the inlet temperature sensor is farther away from the internal heat source and the inner space temperature sensor is adjacent to the heat source in the projector 100, so the temperature of the inlet should be lower than the temperature of the inner space. Therefore, the first temperature interval corresponding to the inlet temperature parameter is lower than the first temperature interval corresponding to the inner space temperature parameter. In some embodiments, the heat tolerance of the color wheel should be greater than the heat tolerance of the laser source. Therefore, the first temperature interval corresponding to the color wheel temperature parameter is higher than the first temperature interval corresponding to the laser source temperature parameter. In addition, in some embodiments, the first temperature intervals corresponding to different temperature sensors IS, SR, SG, SB, SX, WS, LS may be approximate or the same due to various comprehensive factors. For example, the first temperature interval corresponding to the inlet temperature parameter partly overlaps the first temperature interval corresponding to the chip temperature parameter.

In this way, the first temperature intervals set by the temperature sensors IS, SR, SG, SB, SX, WS, LS corresponding to different areas or different elements in the projector 100 may be the same, partially identical, or different, such that the processor is able to accurately determine whether abnormalities occur in any area or element in the projector 100 according to the different temperature tolerant values that different areas or different elements may withstand or operate normally.

As shown in FIG. 2, when the temperature parameter corresponding to any one of the areas falls into the corresponding first temperature interval, the operation S240 is executed, determining, by the processor, whether the multiple fans Fa are set to the maximum speed.

When the temperature parameter corresponding to any one of the areas falls into the corresponding first temperature interval and any one of the fans Fa is not set to the maximum speed, the operation S250 is executed, setting, by the processor, the fans Fa to the maximum speed. The operation S250 is similar to the operation S220, the further explanation is omitted.

In other words, when the projector 100 may partially start to have an abnormality and cause the temperature increasing, increasing the speed of all available fans Fa first is taken as the preventive measures. In this way, by increasing the speed of all the fans Fa to enhance the cooling, the projector 100 can be protected without affecting the playing.

When the temperature parameter corresponding to any one of the areas falls into the corresponding first temperature interval and all the fans Fa are set to the maximum speed, the operation S260 is executed, determining, by the processor, whether the output power of the laser source is the lowest power. The lowest power means the lowest output power of the laser source that is able to keep playing. For example, the lowest power may be about 30 percent of the normal display power. It should be noted that the percentages described above is merely example, not intended to limit the present disclosure.

When the output power of the laser source is the lowest power, the operation S290 is executed, turning off, by the processor, the laser source. When the output power of the laser source is not the lowest power, the operation S270 is executed, lowering, by the processor, the output power of the laser source. Specifically, in some embodiments, the processor lowers the output power of the laser source by 10 percent at each lowering-output-power step. In some other embodiments, the processor lowers the output power of the laser source by 1 percent at each lowering-output-power step. In this way, the laser source is able to finely adjust the output power with small ratio, so that during the process of playing, the viewer is less likely to notice changes in image brightness. It should be noted that, the ratio of lowering the output power is merely example, not intended to limit to the disclosure.

In this way, if the speed of all available fans Fa has been set to the maximum speed but the temperature of the projector 100 is still abnormal, the processor starts to lower the output power of the laser source to avoid further heating. When the processor determines that the temperature of any one of the areas or any one of the elements of the projector 100 has exceeded a temperature threshold that may cause unrecoverable damage, the laser source is turned off by the processor to avoid severe damage to the projector 100.

On the other hand, when the temperature parameter corresponding to any one of the areas of the projector 100 does not fall into the corresponding one of the multiple first temperature intervals, the operation S280 is executed. In operation S280, determining, by the processor, whether the temperature parameter of any one of the areas falls into the corresponding one of the multiple second temperature intervals.

Specifically, the processor determines whether the temperature of any one of the areas falls into the corresponding second temperature interval according to the second temperature intervals correspond to each temperature parameter. The second temperature interval represents the temperature that is significantly higher than the temperature of normal situation. That is, the second temperature interval is higher than the first temperature interval. In other words, the second temperature interval is different from the first temperature interval. In this way, the processor determines whether the temperature of each element or each area of the projector 100 may cause damage.

For example, the second temperature interval corresponding to the temperature of the inlet is over 43 degrees Celsius. The second temperature interval corresponding to the temperature of the red laser source is over 58 degrees Celsius. The second temperature interval corresponding to the temperature of the other laser source is over 73 degrees Celsius. The second temperature interval corresponding to the temperature of the color wheel is over 90 degrees Celsius. The second temperature interval corresponding to the temperature of the chip is over 43 degrees Celsius. The second temperature interval corresponding to the temperature of the inner space of the projector 100 is over 50 degrees Celsius. It should be noted that values described above are merely examples, but not intended to limit to the present disclosure.

When the temperature parameter corresponding to any one the of areas falls into the corresponding one of the multiple second temperature intervals, the operation S290 is executed, turning off, by the processor, the laser source. In other words, when the temperature parameter of any one of areas or any one of the elements of the projector 100 is over the temperature threshold that may cause unrecoverable damage, the processor turns off the laser source to avoid severe damage to the projector 100.

On the other hand, when the temperature parameter corresponding to any one of the areas does not fall into the corresponding one of the multiple first temperature intervals or the multiple second temperature intervals, the processor keeps the output power of the laser source. In other words, when the processor determines that the temperature of each element or each area is normal, the processor will maintain the present operational status.

Specifically, after the operations S250, S270 and/or S280 are executed, the processor will execute the operations S230a and S230b again after a period of time. In some embodiments, the period of time is about 5 minutes. In this way, by detecting the temperature again after a period of time, the temperature can be confirmed whether decreases to the normal range after increasing the speed of the fans Fa or lowering the laser source.

In the foregoing, exemplary operations are included. However, these operations do not need to be performed sequentially. The operations mentioned in the embodiment may be adjusted according to actual needs unless the order is specifically stated, and may even be performed simultaneously or partially simultaneously.

It is noted that, the drawings, the embodiments, and the features and circuits in the various embodiments may be combined with each other as long as no contradiction appears. The circuits illustrated in the drawings are merely examples and simplified for the simplicity and the ease of understanding, but not meant to limit the present disclosure. In addition, those skilled in the art can understand that in various embodiments, circuit units may be implemented by different types of analog or digital circuits or by different chips having integrated circuits. Components may also be integrated in a single chip having integrated circuits. The description above is merely by examples and not meant to limit the present disclosure.

In summary, in various embodiments of the present disclosure, by comparing the speed parameter with the speed threshold, or determining whether the temperature parameter falls into the first or the second temperature intervals, it is able to determine that whether the projector starts to malfunction or the projector may be damaged. Based on the severity level of the failure of the projector, the processor performs appropriate operational controls for preventive protection, temporary alternative, or emergency treatment to avoid further severe damage. To avoid the projector overheating, the speed of the fans is increased or the output power of the laser source is progressively lowered. Therefore, the quality and the time of playing may maintain as much as possible without seriously damaging the projector.

Although specific embodiments of the disclosure have been disclosed with reference to the above embodiments, these embodiments are not intended to limit the disclosure. Various alterations and modifications may be performed on the disclosure by those of ordinary skills in the art without departing from the principle and spirit of the disclosure. Thus, the protective scope of the disclosure shall be defined by the appended claims.

What is claimed is:

1. A projector protection method, comprising:
   detecting, by a plurality of temperature sensors, temperatures of a plurality of areas in a projector to obtain a plurality of temperature parameters respectively;
   detecting, by a plurality of speed sensors, speed of a plurality of fans in the projector to obtain a plurality of speed parameters respectively;
   setting, by a processor, all the fans to a maximum speed when the temperature parameter corresponding to any one of the areas falls into corresponding one of a plurality of first temperature intervals and any one of fans is not set to the maximum speed;
   when one of the speed parameters is lower than a speed threshold, setting the fans except for the one corresponding to the speed parameter which is lower the speed threshold to the maximum speed by the processor;
   determining, by the processor, again whether the temperature parameter corresponding to any one of the areas falls into the corresponding one of the first temperature intervals when all the fans are set to the maximum speed;
   lowering, by the processor, an output power of a laser source when the temperature parameter corresponding to any one of the areas falls into corresponding one of the first temperature intervals and the fans in the projector are set to the maximum speed; and
   turning off, by the processor, the laser source when the temperature parameter corresponding to any one of the areas falls into corresponding one of a plurality of second temperature intervals, wherein the second temperature interval and the first temperature interval corresponding to the same temperature parameter are different from each other;
   wherein the output power of the laser source is lowered by ten percent of the original output power of the laser source by the processor at each lowering-output-power step.

2. The projector protection method of claim 1, further comprising:
   turning off, by the processor, the laser source when the temperature parameter corresponding to any one of the areas falls into the corresponding one of the first temperature intervals and the output power of the laser source is a lowest power.

3. The projector protection method of claim 1, further comprising:
   keeping, by the processor, the output power of the laser source when all the temperature parameters corresponding to the areas do not fall into the corresponding first temperature intervals or the corresponding second temperature intervals.

4. The projector protection method of claim 1, wherein the temperature parameters comprise an inlet temperature parameter, a laser source temperature parameter, a color wheel temperature parameter, a chip temperature parameter or an inner space temperature parameter, wherein the first temperature interval corresponding to the inlet temperature parameter is lower than the first temperature interval corresponding to the inner space temperature parameter.

5. The projector protection method of claim 1, wherein the temperature parameters comprise an inlet temperature parameter, a laser source temperature parameter, a color wheel temperature parameter, a chip temperature parameter or an inner space temperature parameter, wherein the first temperature interval corresponding to the color wheel temperature parameter is higher than the first temperature interval corresponding to the laser source temperature parameter.

6. The projector protection method of claim 1, wherein the temperature parameters comprise an inlet temperature parameter, a laser source temperature parameter, a color wheel temperature parameter, a chip temperature parameter or an inner space temperature parameter, wherein the first temperature interval corresponding to the inlet temperature parameter partly overlaps the first temperature interval corresponding to the chip temperature parameter.

7. A projector, comprising:
a laser source, configured to output a laser beam;
a plurality of temperature sensors, arranged in a plurality of areas in the projector respectively, and configured to detect temperature of the corresponding areas to obtain a plurality of temperature parameters respectively;
a plurality of fans, configured to lower temperature of the areas in the projector;
a plurality of speed sensors, coupled to the fans respectively and detecting speeds of the fans to obtain a plurality of speed parameters respectively; and
a processor, configured to:
set all the fans to a maximum speed when the temperature parameter corresponding to any one of the areas falls into the corresponding one of a plurality of first temperature intervals and any one of the fans is not set to the maximum speed;
when the speed parameter of any one of the fans is lower than a speed threshold, set the fans except for the one corresponding to the speed parameter which is lower the speed threshold to the maximum speed;
determine again whether the temperature parameter corresponding to any one of the areas falls into the corresponding one of the first temperature intervals when all the fans are set to the maximum speed;
lower an output power of the laser source when the temperature parameter corresponding to any one of the areas falls into corresponding one of the first temperature intervals and the fans are all set to the maximum speed; and
turn off the laser source when the temperature parameter corresponding to any one of the areas falls into corresponding one of a plurality of second temperature intervals, wherein the second temperature interval and the first temperature interval corresponding to the same temperature parameter are different from each other;
wherein the output power of the laser source is lowered by ten percent of the original output power of the laser source by the processor at each lowering-output-power step.

8. The projector of claim 7, wherein the processor is further configured to:
turn off the laser source when the temperature parameter corresponding to any one of the areas falls into the corresponding one of the first temperature intervals and the output power of the laser source is a lowest power.

9. The projector of claim 7, wherein the processor is further configured to:
keep the output power of the laser source when all the temperature parameters corresponding to the areas do not fall into the corresponding first temperature intervals or the corresponding second temperature intervals.

10. The projector of claim 7, wherein the temperature sensors comprise one or more of an inlet temperature sensor, a laser source temperature sensor, a color wheel temperature sensor, a chip temperature sensor and an inner space temperature sensor, wherein the inlet temperature sensor is configured to detect temperature of an inlet of the projector, the laser source temperature sensor is configured to detect temperature of the laser source, the color wheel temperature sensor is configured to detect temperature of a color wheel in the projector, the chip temperature sensor is configured to detect temperature of a chip in the projector, the inner space temperature sensor is configured to detect temperature of the inner space of the projector.

11. The projector of claim 10, wherein the first temperature interval corresponding to temperature of the inlet is lower than the first temperature interval corresponding to temperature of the inner space of the projector.

12. The projector of claim 10, wherein the first temperature interval corresponding temperature of to the color wheel is higher than the first temperature interval corresponding to temperature of the laser source.

13. The projector of claim 10, wherein the first temperature interval corresponding to temperature of the inlet partly overlaps the first temperature interval corresponding to temperature of the chip.

* * * * *